July 11, 1961 J. M. COOPER ET AL 2,992,330
POSITION INDICATING SYSTEM
Filed Sept. 5, 1957 3 Sheets-Sheet 2
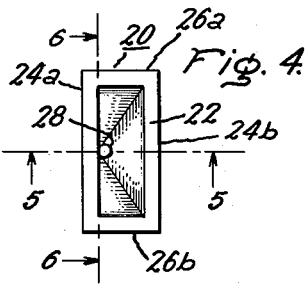
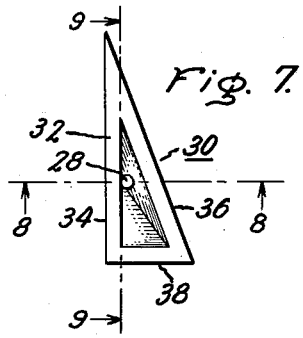
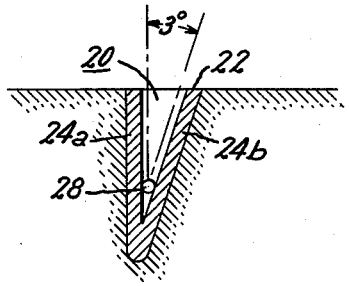
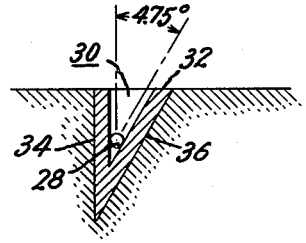
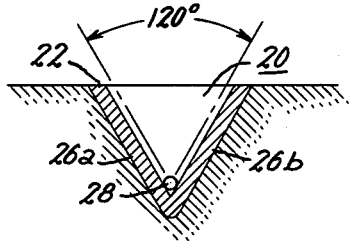
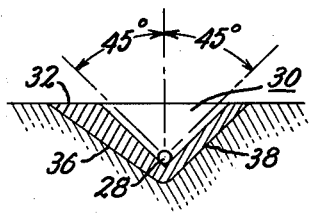
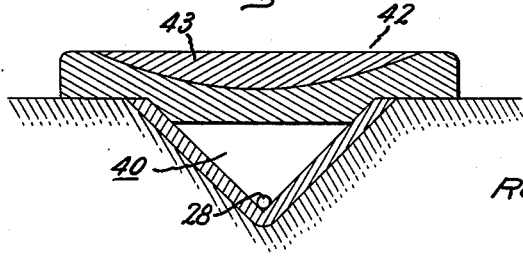
Inventors:
Edward J. Smith,
James M. Cooper,
Roland M. Lichtenstein,
by Francis K. Doyle
Their Attorney.

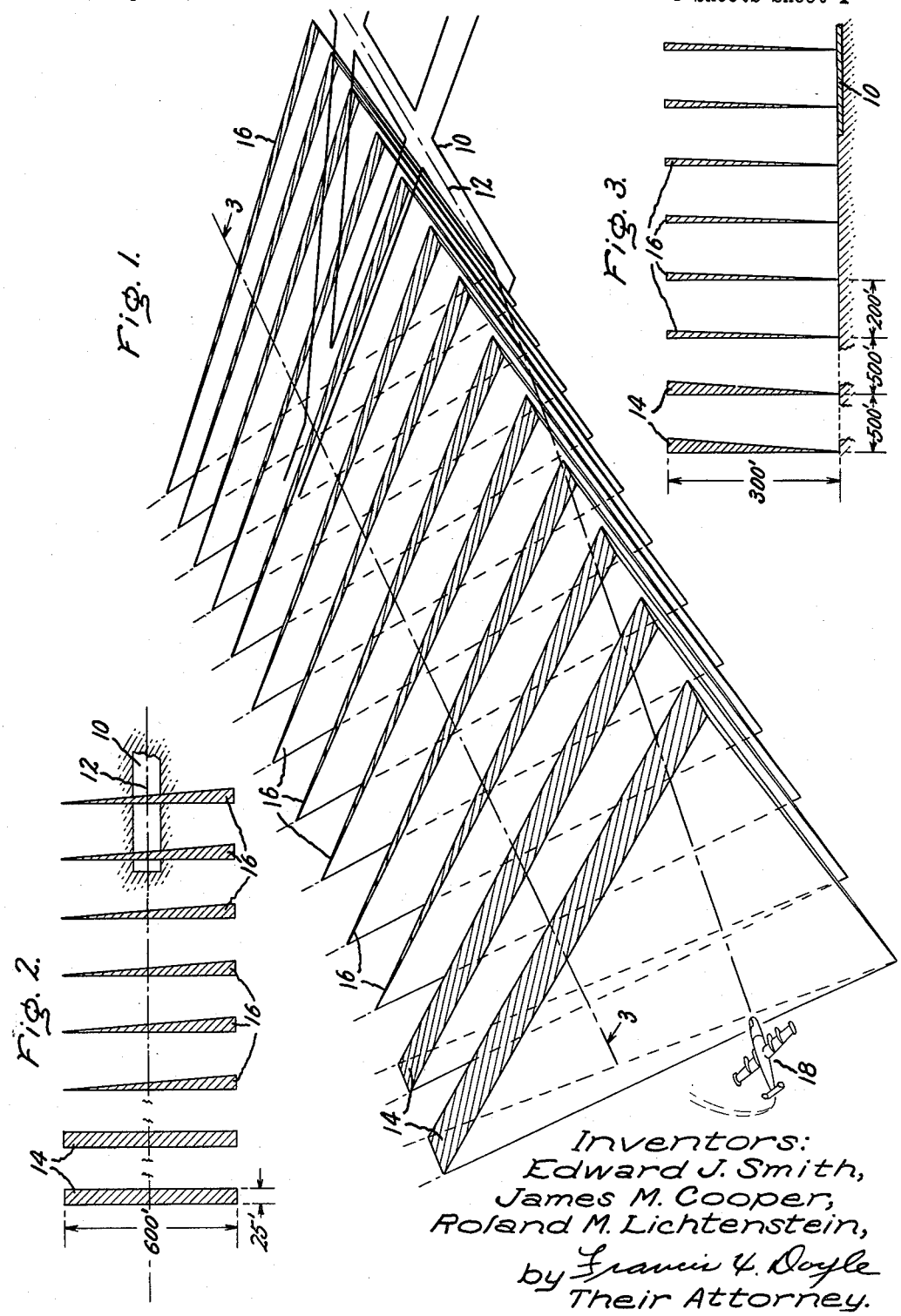

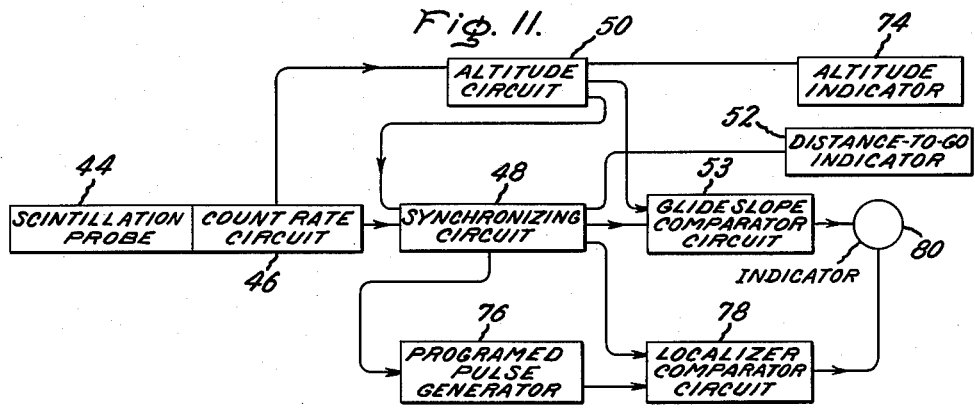
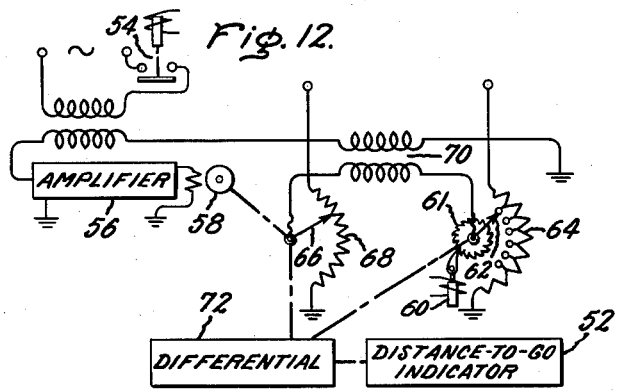
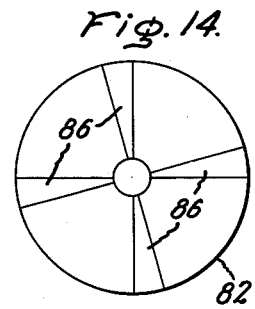
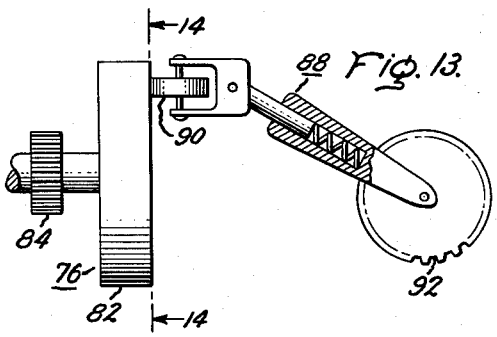
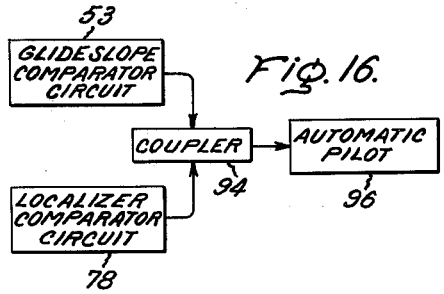
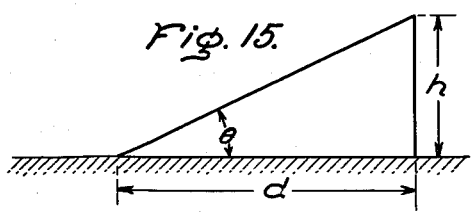
Inventors:
Edward J. Smith,
James M. Cooper,
Roland M. Lichtenstein,
by Francis X. Doyle
Their Attorney.

United States Patent Office 2,992,330
Patented July 11, 1961

2,992,330
POSITION INDICATING SYSTEM
James M. Cooper, Roland M. Lichtenstein, and Edward J. Smith, Schenectady, N.Y., assignors to General Electric Company, a corporation of New York
Filed Sept. 5, 1957, Ser. No. 682,160
9 Claims. (Cl. 250—71.5)

This invention relates to a position indicating system and, more particularly, to a position indicating system for navigable craft, such as aircraft, which will enable the accurate determination of the position of such craft within a specified area, such as an aircraft landing area, in all weather conditions, including conditions of minimum visibility.

The problem of guiding a navigable craft over a dangerous area, or to a landing at a specified area, during bad weather, is well known. For example, the task of guiding an aircraft over dangerous mountain peaks, or a ship through dangerous waters has always been difficult, as has that of landing an aircraft during heavy fog or rain, or guiding a ship to a dock under similar conditions. The invention disclosed herein is especially useful to enable the accurate determination of the position of a navigable craft under all such circumstances. However, for the sake of simplicity and clarity, it will be described with particular reference to the problem of landing aircraft.

As is well known to those skilled in this art, the problem of landing aircraft under all weather conditions is of primary importance for both military and commercial aircraft. One of the most critical portions of the landing problem is the descent of the aircraft to final touchdown under weather ceilings of 300 feet or less. During this descent it is important that the exact position of the aircraft relative to the landing field be obtained. Present day landing systems, such as the instrument landing system (ILS) and ground control approach landing system (GCA), do not provide the necessary reliability at these extremely low altitudes. Under 300 feet the ILS provides unreliable data as to the aircraft's position and, therefore, renders such landings extremely hazardous. Even in the more refined GCA system, positioning errors do occur, thereby leading to erroneous instructions being given the aircraft pilot and the consequent hazards to the pilot and his passengers in making a landing.

With the presently used instrument landing system (ILS) a large quantity of complicated equipment is added to the aircraft. This added equipment increases the weight of the aircraft while the complexity of the equipment provides an element of unreliability and the necessity of technically trained personnel to constantly maintain the equipment in workable condition. The GCA landing system requires a highly complex ground installation and the service of a well trained operator to properly interpret the data and keep the pilot informed during the entire landing operation. Of course, the complex ground installation of the GCA system requires almost constant maintenance of highly skilled technical personnel. The above systems are expensive to procure and costly to maintain. Therefore, it can be seen that there is a great need in the aircraft field for simple, preferably inexpensive and accurate means of establishing aircraft position at very low altitudes including the actual touchdown of the aircraft.

It is therefore a principal object of this invention to provide a position indicating system which will provide accurate information as to the position of a navigable craft relative to a specified area.

It is a further object of this invention to provide an improved position indicating system for a navigable craft which is relatively inexpensive to manufacture and costs less to maintain when compared to known systems.

Another object of this invention is to provide an improved position indicating system which adds little weight to an aircraft and provides a very simple ground installation requiring little maintenance.

It is another object of this invention to provide an improved position indicating system for a navigable craft which is practically unaffected by atmospheric conditions such as fog, rain or snow.

It is a still further object of this invention to provide an improved position indicating system which will provide the pilot of an aircraft with accurate information as to direction, altitude, ground speed and distance-to-go from the time he enters the landing system pattern until final touchdown.

In carrying out this invention in one form, a radiation corridor is provided along or over the desired area. This corridor is provided by a number of self-contained radioactive sources which are installed in fixed relation to the desired area and which are housed in special containers to provide a shaped radiation pattern above the desired area. Detection and computing means are provided in a navigable craft which detects the radiation pattern when the craft is in the corridor. The detection and computing means are constructed and arranged so as to derive accurate information from the radiation patterns of the craft's position relative to the desired area. The derived information may be displayed to the pilot on suitable indicating devices or it may be used to automatically guide the craft, as desired.

This invention will be better understood, and the manner in which its objects are carried out, by a consideration of the following description taken in connection with the accompanying drawings, wherein:

FIGURE 1 is a perspective view showing an airfield runway and runway approach area and the radiation pattern formed above such runway and runway approach area.

FIGURE 2 is a partial top view of the radiation pattern shown in FIGURE 1.

FIGURE 3 is a partial elevation view of the radiation pattern taken on the line 3—3 of FIGURE 1.

FIGURE 4 is a top view of one of the containers used to hold a source of radiation and to provide a shaped radiation pattern.

FIGURE 5 is an elevation view in section taken on the line 5—5 of FIGURE 4.

FIGURE 6 is an elevation view in section taken on the line 6—6 of FIGURE 4.

FIGURE 7 is a top view of another type of container used to hold a source of radiation and designed to provide different shaped radiation pattern.

FIGURE 8 is an elevation view in section taken on the line 8—8 of FIGURE 7.

FIGURE 9 is an elevation view in section taken on the line 9—9 of FIGURE 7.

FIGURE 10 is an elevation view similar to that shown in FIGURES 6 and 9 and provided with a cover to improve the radiation pattern obtained.

FIGURE 11 is a block diagram of one form of a detector and computer circuit for detecting the radiation patterns, and deriving the desired information therefrom.

FIGURE 12 is an electric schematic diagram of one form of the synchronizing circuit shown in block form in FIGURE 11.

FIGURE 13 is a side view, partially in section of one form of a programmed pulse generator used in the aircraft detector and computer circuit.

FIGURE 14 is a side view of a portion of the programmed pulse generator taken on the line 14—14 of the FIGURE 13.

FIGURE 15 is a diagrammatic showing of the glide slope path of an aircraft utilizing this invention, and;

FIGURE 16 is a partial schematic showing of one form of a completely automatic landing system.

Referring now to the drawings wherein like numerals are used to indicate like parts throughout, and in particular with reference to FIG. 1, this invention in one form is shown as an aircraft landing system utilizing a radiation pattern above a portion of the runway and the runway approach area of an aircraft landing field. As shown in FIG. 1, the aircraft landing field runway 10, having a center line 12, and its runway approach area (not numbered) are provided with a number of radiation sources (not shown), placed along the center line 12 and its continuation into the runway approach area, which define a flight radiation corridor by means of shaped radiation patterns. In the preferred embodiment shown, the outer two radiation patterns 14 and 14 of the flight radiation corridor are generally rectangular in shape in the top view thereof, as more clearly shown in FIG. 2, while the sides thereof taper down to the radiation source, forming a four-sided inverted pyramidal pattern, as is clearly shown in FIG. 1. The remainder of the radiation patterns, generally designated 16, in the flight radiation corridor are preferably triangularly shaped in the top view, as is more clearly shown in FIG. 2, and also taper down toward the radiation source in a manner similar to the outer radiation patterns 14, forming an inverted pyramidal pattern having three sides, as is clearly shown in FIG. 1. These corridor markers or radiation patterns 16 are so shaped such that when an aircraft 18 is directly in the center line of the corridor shown as line 12 in FIG. 2, it will pass through a given width of radiation pattern. However, if it varies to one side of the center line 12 it will pass through a smaller width of the radiation pattern, and on the other side of the center line it will pass through a greater width of radiation pattern. Referring to FIGS. 1 and 2, when the aircraft is approaching the landing field if it is to the left of the center line of the radiation corridor it will pass through a smaller width of the radiation pattern while if it is to the right of the center line of the flight corridor it will pass through a greater width of the radiation pattern than it would if the airplane were flying directly in the center line of the radiation pattern.

In the preferred embodiment, the outer corridor marker 14 will be 500 feet from the second corridor marker 14, as indicated in FIG. 3. Also the second corridor marker 14 will be spaced 500 feet from the first triangular corridor marker 16. The distance between each of the corridor markers 16 will be 200 feet. Obviously, any other desired distance could be used in spacing the various corridor markers 14 and 16. As shown in FIGS. 2 and 3, a radioactive source is chosen to provide a detectable radiation pattern 300 feet above the source, and each marker is shaped to provide a pattern 600 feet wide and 25 feet deep at the 300 feet height.

In order to provide the preferred radiation pattern 14 for the outer corridor markers a lead container is provided as shown in FIGS. 4, 5 and 6. As there shown, the lead container 20 is in the form of an inverted four-sided pyramid, with a rectangular top 22 and sides 24a, 24b, 26a and 26b converging at the bottom of the container where a source of radioactive material 28 is placed. As shown in FIG. 5, the container 20 is provided with one vertical side 24a and one oblique side 24b. This provides the straight forward edge of the radiation pattern 14 and the sloping rear edge, as is clearly shown in FIG. 3. The other sides 26a and 26b of container 20 are both oblique to shape the radiation pattern 14 to the desired width about the center line of the flight corridor, as is clearly shown in FIG. 1. The angles shown in FIGS. 5 and 6 are those necessary to provide the desired width and thickness to the pattern, as shown in FIGS. 2 and 3. Of course, it will be understood that any desired shape of the outer corridor radiation pattern could be provided by properly shaping the lead container 20.

FIGS. 7, 8 and 9 show the preferred embodiment of the containers for the inner corridor radiation patterns 16. As shown in FIG. 7 a container 30 is provided in the form of an inverted pyramid with three sides, having a top 32 of triangular shape and being provided with converging sides 34, 36 and 38. The container 30 has one straight side 34 to provide a straight forward edge to the radiation pattern 16, as shown in FIG. 3, while the sides 36 and 38 are oblique to provide the desired width to the radiation pattern 16 as shown in FIGS. 1 and 2. Due to the shape of the container 30 the inner corridor markers or radiation patterns 16 are shaped to have a triangular top so as to provide the desired indication about the center line as hereinbefore described. The indicated angles provide the width and thickness shown in FIGS. 2 and 3.

FIGURE 10 is an elevation view of one side of a container 40 which may be in the form of the container 20, the container 30 or any other desired form. The container 40 is provided with a top 42 which top is designed to equalize the strength of the radiation emitting from the source 28. The top 42 is provided with a lead insert 43 which is shaped as shown to provide a desired thickness in the center and tapers along the arc of a curve to the outer portion of the cover. As is well known to those familiar with radiation, the strength or intensity of the radioactive rays, that is, the number of energized photons per unit area at any distance from the source, varies inversely as the square of the distance from the source, neglecting air absorption and scattering. Therefore, with the containers as shown in FIGS. 4-9, the radioactive rays present in the center of the radiation patterns 14 and 16 in a given horizontal plane would be stronger than the radioactive rays at the sides of the radiation pattern due to the differences in their distance from their source. However, with a cover 42 such as is shown in FIG. 10 the radioactive rays emitted directly above the source will be attenuated more than the radioactive rays directed at an angle from the source such that in a horizontal plane at any distance above the source the radioactive rays forming the radiation pattern will be of equal strength. That is, there will be planes of constant radiation intensity parallel to the ground at various heights above the radioactive source.

The airborne detection and computing equipment which is carried in the aircraft to enable the pilot to utilize the radiation pattern hereinbefore described is shown in FIGS. 11, 12, 13 and 14. This equipment is used to determine the aircraft's position within the radiation corridor. For example, from the radiation intensity the equipment can determine whether the aircraft is in the center of the radiation corridor. The specific features of the detection and computing equipment are described below. FIG. 11 is a block diagram of a preferred embodiment of the airborne detection and computing system according to this invention. As shown in FIG. 11, a scintillation probe 44 is provided to detect the radiation pattern through which the aircraft is flying. The scintillation probe may be any of those presently known and is preferably provided with two sodium-iodide crystals with a photo-multiplier tube mounted behind each crystal and a cathode follower output circuit attached to each photo-multiplier tube. A count rate circuit 46 is connected to the output of the cathode follower circuits and may be a modified "flip-flop" circuit, whose output is a single pulse envelope dependent on the number of scintillation pulses received from the scintillation probe, but is independent of the amplitude of the input pulses. The output of the count rate circuit 46 is fed to a synchronizing or computing circuit 48, which changes the data from the probe 44 and count rate circuit 46 into usable intelligence signals. A preferred embodiment of the synchronizing or computing circuit 48 is shown in FIG. 12 and described below. The synchronizing circuit 48 provides signals to the altitude circuit 50, the distance-to-go indicator 52, the glide slope comparator circuit 53 and the other circuits as shown in FIG. 11.

A preferred schematic diagram of the synchronizing circuit 48 is shown in FIG. 12. It will be described as used to derive the distance-to-go information. This synchronizing circuit 48 is provided with a relay 54 which is actuated by the radiation encountered by the aircraft in the outer corridor marker 14. The radiation closes the relay 54 thereby providing a fixed A.-C. input voltage to the amplifier 56 from an appropriate A.-C. source (not shown). This voltage is chosen to provide a fixed A.-C. signal from the amplifier 56 which will turn the motor 58 at a speed corresponding to the nominal approach speed of the aircraft in which the detection equipment is placed, and the motor in turn drives the wiper arm 66 of a potentiometer 68.

The voltage signal from the radiation of the outer marker received through the relay 54 also actuates the solenoid 60 which operates a ratchet switch 61 to which is attached the wiper arm 62 of a non-linear potentiometer 64. Potentiometer 64 is described as non-linear in that each step on the potentiometer 64 represents a separate radiation marker. In the preferred embodiment the markers 14 will be farther apart than are the radiation markers 16, as hereinbefore set forth. The actuation of the solenoid 60 causes the wiper 62 to move one step on non-linear potentiometer 64. This movement causes an error signal to appear between the wiper arm 62 of the potentiometer 64 and the wiper arm 66 of the potentiometer 68. This error voltage appears across the windings of transformer 70 thereby adding to the signal fed to the amplifier 56. This error signal increases the output of the amplifier 56 thereby causing the motor 58 to accelerate and move the wiper arm 66 along the potentiometer 68 to eliminate the error signal. When the second radiation pattern 14 is reached, the solenoid 60 is again actuated causing the wiper 62 to move another step along the potentiometer 64. At this time, if the aircraft is flying at a speed higher than its usual approach speed, an error signal will again appear between the wiper arms 62 and 66 thereby increasing the output of the amplifier 56 and increasing the speed of the motor 58 to move the wiper 66 so as to eliminate the error signal. The solenoid 60 is tripped each time one of the radiation patterns is entered, thereby moving ratchet switch 61 and causing the wiper 62 to be moved along the steps of potentiometer 64. Should the speed of the aircraft be increased or decreased during the landing approach, the motor 58 will synchronize to the actual flight conditions as the aircraft passes through the following radiation pattern. For example, should the aircraft fly at a speed lower than normal approach speed, the motor 58 would tend to drive the wiper 66 beyond the movement of wiper 62 so as to produce an error signal of opposite polarity. This signal will be fed through the transformer 70 to the amplifier 56 in opposition to the fixed A.-C. signal applied to amplifier 56. Thus the output of the amplifier 56 will be reduced thereby slowing down the motor 58.

The ratchet switch 61 and the wiper 66 are also connected to a differential 72 to provide the desired information on the distance-to-go indicator 52. As the solenoid 60 is tripped each time one of the radiation patterns is entered, it in turn moves ratchet switch 61 which causes the distance-to-go indicator 52 to be moved in incremental steps equal to the distance between the radiation patterns. The wiper 66 moves the distance-to-go indicator 52 through the differential 72 at a rate according to the speed of the motor 58, thereby providing an indication of the correct distance-to-go when the aircraft is between the various radiation patterns. Should the motor 58 be driven faster than the actual speed of the aircraft, then the wiper 66 will cause the distance-to-go indicator 52 to be moved the actual distance between the radiation pattern before the solenoid 60 is tripped by the next radiation pattern. However, the tripping of solenoid 60 by the following radiation pattern will automatically recenter the distance-to-go indicator through ratchet switch 61 to show the correct distance while, at the same time, the error signal between the wiper 66 and the wiper 62 is applied to the motor 58 and the amplifier 56 to slow down the motor 58 in the manner described above. Of course, it will be obvious that an indicator showing the ground speed of the aircraft could be included, if desired, driven by motor 58 which is syncronized to actual ground speed.

The altitude circuit 50 may be used to drive the altitude indicator 74 to provide an indication of the true altitude of the aircraft. The altitude circuit 50 obtains the pulses received by the count rate circuit 46 from the scintillating probe 44 and counts these pulses over a short time interval. This time interval may be initiated by a relay, e.g., a relay similar to relay 54, which is energized by signals derived from the leading edge of each radiation pattern. The time interval is sufficiently small so as to provide a complete count before probe 44 passes through the radiation pattern. With the radiation source used known, the strength of the signal of the radiation pattern is a factor of the altitude above the source. This signal strength is indicated by the number of pulses counted over the interval of time. This signal is proportional to the true altitude of the aircraft and may be fed to the altitude indicator 74 to provide an accurate indication of the true altitude of the aircraft.

The position of the aircraft with respect to the center line of the radiation pattern is obtained by the programmed pulse generator 76 and the localizer comparator circuit 78 and is visually indicated on an indicator 80 which may be, for example, an ILS cross point meter. The programmed pulse generator 76 is shown in FIG. 13 as a disk 82 being driven by a gear 84 which is connected to the motor 58 in any desired manner to drive the disk 82 at a rate corresponding to the speed of the aircraft. The disk 82, as is more clearly shown in FIG. 14, is provided with a number of commutator bars 86 which are shaped in the same manner as a vertical section of the radiation patterns 16 as shown in FIG. 3. A pick-off wiper, generally indicated at 88, and comprising a roller 90 picks off a pulse from the commutator bars 86 and feeds this pulse to the localizer comparator circuit 78. The pick-off wiper 88 is connected by means of gear 92 to the altitude indicator 74 in any desired manner, for example, by means of a gear train (not shown) so as to move the pick-off roller 90 along the face of the disk 82 to pick off a pulse from the commutator bars 86 corresponding to the width of a pulse at the center line of the radiation pattern at the true altitude of the aircraft. Of course, an electrical signal from the altitude circuit 50 could be used to move the pick-off roller 90, if desired.

A pulse derived from the synchronizing circuit 48, which is indicative of the actual width of the radiation pattern through which the aircraft is flying, is also fed to the localizer comparator circuit 78. This pulse and that received from the programmed pulse generator are compared in the circuit 78 and a difference signal is obtained if the aircraft is not flying along the center line of the radiation corridor. The polarity of the difference signal will indicate whether the aircraft is flying to the left or to the right of the center line of the radiation corridor. For example, considering FIG. 2 and the center line 12 of the radiation pattern, should the aircraft be flying to the left of the center line the actual pulse generated in the synchronizing circuit and fed to the localizer comparator circuit 78 will be smaller than the programmed pulse generated by the programmed pulse generator 76. Arbitrarily assigning a positive polarity when the programmed pulse is larger than the actual pulse then a difference signal of a positive polarity will be fed to the indicator or meter 80 to provide a fly right indication, Conversely, should the aircraft be flying to the right of the center line as shown in FIG. 2, then the actual pulse obtained will be larger than the programmed pulse generated by the programmed pulse generator 76. When these two pulses are compared in the localizer comparator circuit 78 a difference signal of negative polarity will be obtained which will be fed to the meter 80 to provide a fly left indication on the meter.

The glide slope path of an aircraft is shown in FIG. 15. The desired glide slope path can be determined for any aircraft. This path is a line angled up from the ground at a glide slope angle $\theta$, as shown in FIG. 15. The desired glide slope angle $\theta$ can be set into the synchronizing circuit 48 for the aircraft in which the detection and computing equipment is carried. When the distance-to-go measurement "$d$" is generated in the synchronizing circuit 48, it can be combined with the preset glide slope angle $\theta$, in any known manner, to provide a signal proportional to the desired altitude "$h$." This is done by setting the equipment for the equation:

$$h = d \tan \theta$$

The "$h$" signal, proportional to the desired altitude is fed to the glide slope comparator circuit 53, where it is compared to a signal proportional to the actual altitude of the aircraft. This latter signal is provided by the altitude circuit 50. If an error exists between the actual and the desired altitude, an error signal is fed from the comparator circuit 53 to the meter 80 to show such error. If the desired altitude is lower than the actual altitude the meter 80 will provide a fly down indication, while if the desired altitude is higher than the actual altitude the meter 80 will provide a fly up indication. The polarity of the error signal from comparator 53 will provide such indication to the meter 80 in the same manner as described for the localizer comparator circuit 78.

From the above description it will be apparent to those skilled in the art that there is provided an aircraft landing system which utilizes shaped radiation patterns to enable an aircraft carrying the described detection and computing equipment to be brought to a safe landing by the pilot of such aircraft even though the landing field is so overcast that the pilot is unable to see the field.

Of course, it will be obvious to those skilled in the art, that the altitude indicator 74 and the distance-to-go indicator 52 are not necessary to enable a human pilot to manually land his aircraft. The human pilot could safely land his aircraft merely by using the information presented on the meter 80.

The device of this invention may also be used to provide automatic landing of an aircraft, if desired. FIG. 16 is a partial schematic showing of one form of a completely automatic landing system according to this invention. As there shown, the information from the glide slope comparator circuit 53 and the localizer comparator circuit 78 is fed through a coupler 94 to a conventional automatic pilot 96. The coupler 94 may be of any known type which will convert the signals derived from the circuit 53 and the circuit 78 into the signals necessary to cause the automatic pilot 96 to direct the aircraft along the desired flight path. The automatic pilot 96, directed by the signals, safely lands the aircraft.

While this invention has been described with reference to an aircraft landing system, it will be obvious to those skilled in the art that similar means may be utilized to guide any type of navigable craft under conditions of minimum visibility. For example, radiation sources could be utilized along a dangerous shore to provide a radiation pattern over water such that a ship carrying detection and computing equipment similar to that described above could be safely guided through a safe channel during periods of minimum visibility. Of course, many other uses of the invention described will be readily apparent to those skilled in the art.

While there has been shown and described but one embodiment of this invention, many modifications will appear obvious to those skilled in the art. Therefore, it is intended to claim all such modifications which fall within the spirit and scope of this invention.

What is claimed as new and desired to be secured by Letters Patent of the United States is:

1. A position indicating system for a navigable craft to enable a pilot of such craft to determine his position within a specified area comprising; a plurality of radioactive sources disposed in spaced relation to provide a radiation corridor within said specified area, containers for said radioactive sources, said containers being designed to shape the radioactive rays emitted from said radioactive sources into predetermined shapes and patterns at predetermined distances from said radioactive sources, and detection means carried by said craft, said detection means being constructed and arranged to derive information from said radiation corridor indicative of the position of said craft within said corridor.

2. A position indicating system for a navigable craft to enable a pilot of such craft to determine his position within a specified area comprising; a plurality of radioactive sources disposed in spaced relation to provide a radiation corridor within said specified area, containers for said radioactive sources, said containers being designed to shape the radioactive rays emitted from said radioactive sources into predetermined shapes and patterns at predetermined distances from said radioactive sources, cover means provided for said containers to attenuate said radioactive rays emitted from said radioactive sources to provide a plane of constant radiation intensity at any height above said radioactive sources, and detection means carried by said craft, said detection means being constructed and arranged to derive information from said radiation corridor indicative of the position of said craft within said corridor.

3. A position indicating system for a navigable craft to enable a pilot of such craft to determine his position within a specified area comprising; a plurality of radioactive sources disposed in spaced relation to provide a radiation corridor within said specified area, containers for said radioactive sources, said containers being designed to shape the radioactive rays emitted from said radioactive sources into predetermined shapes and patterns at predetermined distances from said radioactive sources, and detection means carried by said craft to derive information from said predetermined pattern indicative of the position of said craft within said radiation corridor, said detection means including a scintillation probe activated by said radioactive rays, a count rate circuit actuated by said scintillation probe, a synchronizing circuit adapted to be energized by said count rate circuit and comparator circuits for comparing the output of said synchronizing circuit with predetermined signals to derive said information indicative of said craft's position within said radiation corridor.

4. In an aircraft landing system to enable an aircraft to land under conditions of minimum visibility the combination comprising; radioactive sources mounted in fixed relation to the ground and spaced along the desired landing area for providing a radiation corridor of predetermined shape and pattern at a predetermined distance above the landing area, and detection means adapted to be carried by an aircraft, said detection means deriving altitude, direction and distance-to-go information from said radiation corridor whereby a pilot is able to land an aircraft carrying said detection equipment in accordance with said information.

5. An aircraft landing system for enabling an aircraft to be landed during conditions of minimum visibility comprising; a plurality of radioactive sources mounted in fixed relation to the ground and spaced along the desired landing area for providing a radiation corridor of a predetermined shape and pattern at a predetermined distance above said landing area, detection means carried by an aircraft for determining the position of said aircraft within said radiation corridor, said detection means including a radiation sensitive means and a synchronizing means to derive information relative to the position of said aircraft within said corridor, whereby said aircraft may be safely landed in said desired landing area.

6. An aircraft landing system for enabling an aircraft to be landed during conditions of minimum visibility comprising; a plurality of radiation sources mounted in fixed relation to the ground and spaced along the desired landing area for providing a radiation corridor above the landing area, containers for holding said radioactive sources, said containers being of an inverted pyramidal design to provide separate shaped radiation patterns above each of said radioactive sources, said shaped radiation patterns forming said radiation corridor, cover means provided for each said container to attenuate the radioactive rays emitted from said radioactve sources to thereby provide a plane of constant radiation intensity within said radiation corridor at any height above said radioactive sources, and detection means adapted to be carried by an aircraft for determining the position of such aircraft within said radiation corridor, said detection means including, a radiation sensitive device activated by said separate radiation patterns, a synchronizing means energized by said activated radiation sensitive device for deriving information relative to the position of said aircraft within said radiation pattern, and means actuated by said synchronizing means in relation to said derived information, whereby said aircraft can be safely landed within said desired landing area.

7. An aircraft landing system for enabling an aircraft to be landed during conditions of minimum visibility comprising; a plurality of radiation sources mounted in fixed relation to the ground and spaced along the desired landing area for providing a radiation corridor above the landing area, containers for holding said radioactive sources, said containers being of an inverted pyramidal design to provide separate shaped radiation patterns above each of said radioactive sources, said shaped radiation patterns forming said radiation corridor, cover means provided for each said container to attenuate the radioactive rays emitted from said radioactive sources to thereby provide a plane of constant radiation intensity within said radiation corridor at any height above said radioactive sources, and detection means adapted to be carried by an aircraft for determining the position of such aircraft within said radiation corridor, said detection means comprising; a scintillation probe adapted to be activated by said separate radiation patterns, a count rate circuit adapted to be energized by said activated scintillation probe, an altitude circuit and a synchronizing circuit adapted to be energized by said count rate circuit, a glide slope comparator circuit energized by said altitude circuit and said synchronizing circuit for determining the position of said aircraft relative to a preset glide slope path, a programmed pulse generator energized by said synchronizing circuit, and a localizer comparator circuit energized by said programmed pulse generator and said synchronizing circuit for determining the position of said aircraft relative to the longitudinal center line of said radiation corridor, whereby said aircraft can be safely landed within said desired landing area according to the determined position of said aircraft.

8. An aircraft landing system as claimed in claim 7 in which the said detection means further comprises an indicator actuated by said glide slope comparator circuit and said localizer comparator circuit to constantly indicate to the pilot of said aircraft its position relative to the present glide slope path and the longitudinal center line of said radiation corridor, whereby the said pilot can safely land the said aircraft by maintaining its position along the present glide slope path and the longitudinal center line of said radiation pattern.

9. In a position indicating system for navigable craft for determining the position of said navigable craft within a designated area, the combination comprising; a plurality of radioactive sources mounted in spaced relation to the designated area for providing a radiation corridor of a predetermined shape and pattern above said designated area, separate containers, each of said containers holding one of said radioactive sources, said containers being constructed so as to provide separate shaped radiation patterns forming said radiation corridor, cover means provided for each of said containers to attenuate the radioactive rays emitted from said radioactive sources for providing a plane of constant radiation intensity within said radiation corridor at any distance from said radioactive sources, and detection means adapted to be carried by said craft, said detection means comprising; a scintillation probe adapted to be activated by said separate radiation patterns, a count rate circuit energized by said scintillation probe, a synchronizing circuit energized by said count rate circuit, a generator circuit energized by said synchronizing circuit for generating a signal proportional to the center line of said radiation corridor, a comparator circuit for comparing said signal from said generator circuit with a signal from said synchronizing circuit to determine the true position of said craft relative to the center line of said radiation pattern, additional circuit means energized by said count rate circuit for determining the distance of said craft from said radioactive sources, and indicating means actuated by said comparator circuit and said additional circuit means for indicating the position of said craft within said designated area.

References Cited in the file of this patent

UNITED STATES PATENTS 2,656,470   Herzog ---------------- Oct. 20, 1953